United States Patent
Fagrenius et al.

(10) Patent No.: US 7,880,586 B2
(45) Date of Patent: Feb. 1, 2011

(54) COOLING SYSTEM FOR A MOBILE TERMINAL FOR WIRELESS COMMUNICATION

(75) Inventors: Gustav Fagrenius, Dalby (SE); Olof Simonsson, Malmö (SE); Göran Schack, Ahus (SE)

(73) Assignee: Sony Ericsson Mobile Communications AB, Lund (SE)

( * ) Notice: Subject to any disclaimer, the term of this patent is extended or adjusted under 35 U.S.C. 154(b) by 846 days.

(21) Appl. No.: 10/599,787

(22) PCT Filed: Apr. 6, 2005

(86) PCT No.: PCT/EP2005/003621

§ 371 (c)(1), (2), (4) Date: Aug. 8, 2007

(87) PCT Pub. No.: WO2005/104334

PCT Pub. Date: Nov. 3, 2005

(65) Prior Publication Data

US 2008/0002361 A1     Jan. 3, 2008

(30) Foreign Application Priority Data

Apr. 22, 2004 (EP) .................. 04009543

(51) Int. Cl.
    *G08B 6/00*       (2006.01)
    *H05K 7/20*       (2006.01)

(52) U.S. Cl. .......... 340/7.6; 361/695; 455/567; 379/374.03; 73/87

(58) Field of Classification Search ............. 340/7.6, 340/965; 379/52, 374.03; 455/567; 310/81, 310/52, 58; 361/690, 694–695, 814; 73/87
See application file for complete search history.

(56) References Cited

U.S. PATENT DOCUMENTS

| | | | | | |
|---|---|---|---|---|---|
| 3,911,416 | A | * | 10/1975 | Feder ........................ | 340/7.6 |
| 4,495,826 | A | * | 1/1985 | Musschoot .................. | 74/87 |
| 5,134,893 | A | * | 8/1992 | Hukki et al. ................ | 74/61 |

(Continued)

FOREIGN PATENT DOCUMENTS

DE     43 15 344     11/1994

(Continued)

OTHER PUBLICATIONS

JP-2000-252667-A (machine translation), Sony Corp, Cooler/vibrator for electronic apparatus and communication apparatus, Sep. 2000, paragraphs 20-23.*

(Continued)

*Primary Examiner*—George A Bugg
*Assistant Examiner*—Anne V Lai
(74) *Attorney, Agent, or Firm*—Renner, Otto, Boisselle & Sklar, LLP

(57) ABSTRACT

The present invention relates to a cooling system for a mobile terminal for wireless communication comprising a rotating fan (1) for reducing the heat generated by the mobile terminal and at least one weight (3) for causing an unbalance of the rotation of the fan (1) in order to cause vibration of the fan, whereby said weight is activated when the rotational speed of the fan (1) exceeds a predefined level.

11 Claims, 4 Drawing Sheets

U.S. PATENT DOCUMENTS

| | | | | |
|---|---|---|---|---|
| 5,909,074 A | * | 6/1999 | Takaya et al. | 310/81 |
| 5,988,978 A | * | 11/1999 | Pearce | 416/145 |
| 6,002,927 A | | 12/1999 | Hayes, Jr. | |
| 6,323,757 B1 | * | 11/2001 | Nagai | 340/407.1 |
| 6,585,595 B1 | * | 7/2003 | Soma | 463/36 |

FOREIGN PATENT DOCUMENTS

| | | | |
|---|---|---|---|
| EP | 0 667 672 A1 | | 8/1995 |
| FR | 1464407 | | 3/1967 |
| GB | 676513 | | 7/1952 |
| GB | 862591 | | 3/1961 |
| JP | 2000-252667 A | * | 9/2000 |
| JP | 2005-131462 A | * | 5/2005 |

OTHER PUBLICATIONS

Baumers et al, Mechanical vibrator with speed dependent out-of-balance weight has radially movable flyweight with position securing resetting spring; EP 70343 A1; DEWENT 1983-B8199K, Abstract.*

Kondryatyuk et al, Adjustable vibrator drive for vibratory machine tools has radial movement of debalancer weight effected by coil located between two electromagnets and alternately connected to them; RU 2004399 C1; DERWENT 1994-116081; Abstract.*

International Search Report for corresponding Application No. PCT/EP2005/003621 mailed Oct. 7, 2005.

* cited by examiner

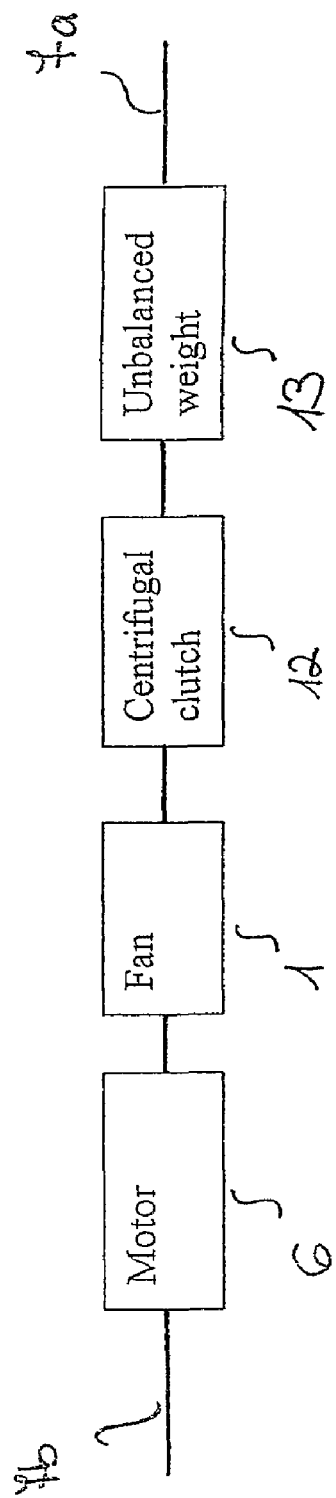

COOLING SYSTEM FOR A MOBILE TERMINAL FOR WIRELESS COMMUNICATION

TECHNICAL FIELD OF THE INVENTION

The present invention relates to a cooling system for a mobile terminal for wireless communication according to claim 1.

DESCRIPTION OF RELATED ART

In the field of mobile terminals, such as mobile phones, pagers, personal digital assistants, electronic organisers and so forth, the number of new functionalities and components is constantly increasing. Due to developments like a higher processing capacity or a wider field of application, the heat generated by the mobile terminal and their components is increasing. Therefore, the temperature of the mobile terminal is raised beyond a comfortable level which may result in a possible damage to the mobile terminal or an uncomfortable handling for the user.

In conventional mobile terminals a cooling mechanism is not provided, but the amount of heat produced in e.g. mobile phones is expected to be higher in the future, so for future mobile terminals a cooling mechanism should be included.

One possibility to remove heat from the mobile terminal is to force air to circulate through it. This can be achieved for example by adding a fan.

The disadvantage of implementing a fan or another cooling mechanism is the higher effort in constructing and controlling the different parts implemented in the mobile terminal.

SUMMARY

It is therefore the object of the present invention to provide a cooling mechanism for mobile terminals that is simple and easy to implement without increasing the number of components.

This object is achieved by a cooling system for a mobile terminal for wireless communication as defined in the independent claim. Further embodiments of the invention are set out in the independent claims.

According to the present invention a cooling system for a mobile terminal for wireless communication is described comprising a rotating fan for reducing the heat generated by the mobile terminal and at least one weight for causing an unbalance of the rotation of the fan in order to cause vibration of the fan, whereby said weight is activated when the rotational speed of the fan exceeds a predefined level.

By using weights which cause an unbalance and therefore vibration of a fan in the mobile terminal, the preexisting functionality of the vibration alarm of a mobile terminal can be combined with a cooling mechanism in a simple and effective way. Hereby, the fan functions as a cooling system at a low rotational speed and on the other hand functions as a vibration system when exceeding a certain rotational speed. This way, one component in the mobile terminal covers two functionalities.

Preferably, the fan consists of blades.
Further preferably, the fan consists of four blades.
Advantageously, each weight is attached to one blade. Further advantageously, at least one blade has to attached blade.
The weight can be held to the centre of the fan by a spring.
Preferably, the weight is movable along the blade.
The weight can be guided along the blade by a bar.
The weight can encompass the blade.

In a preferred embodiment the weight is coupled to the fan by a clutch.

Preferably, the weights and the fan have a common rotational axis.

Further preferably, the clutch is a centrifugal clutch.

It should be emphasised that the term "Comprises/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

The Enclosed
FIG. 4 shows a second embodiment of the present invention.

DETAILED DESCRIPTION OF EMBODIMENT

It is to be noted, that the following description refers to a mobile terminal, which may include a mobile phone, a pager, a personal digital assistant, electronic organisers or any other mobile equipment.

Figure 1:
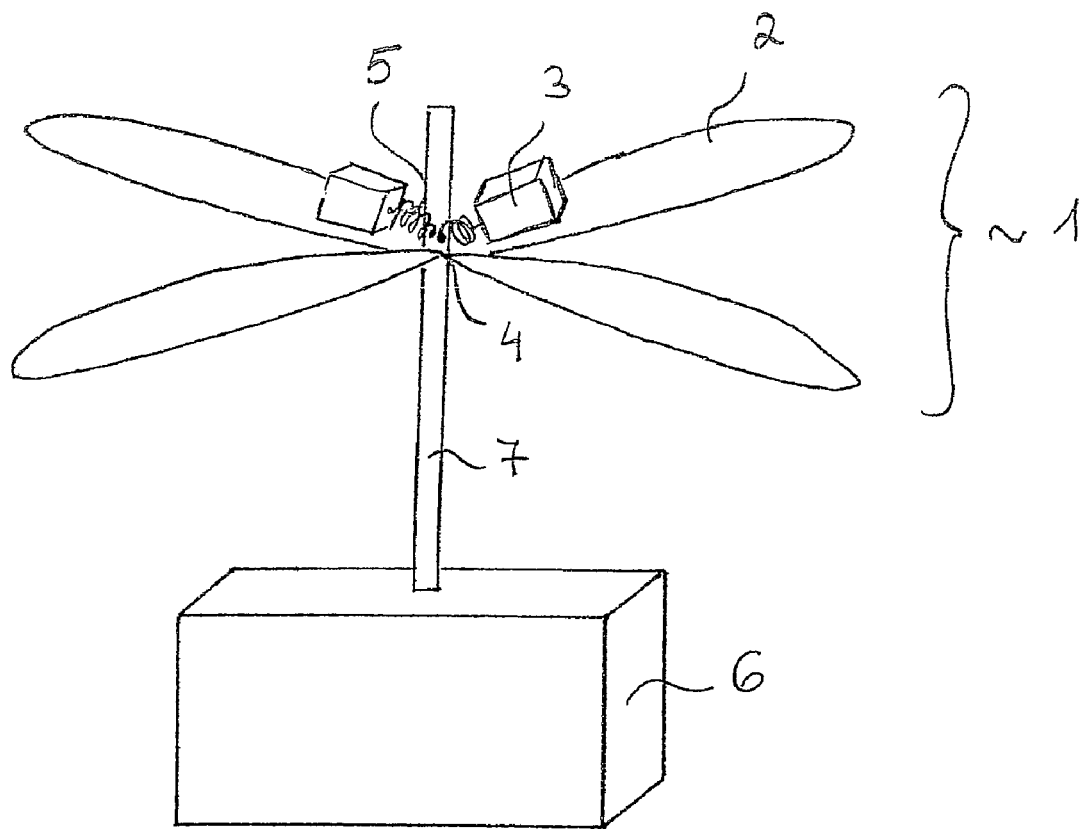
FIG. 1 shows a first embodiment of the present invention during a first operating status.

FIG. 1 shows a first embodiment of the present invention. Hereby, a fan 1 having a rotational axis 7 is driven and controlled by a motor 6 to which the rotational axis 7 is connected. The centre 4 of the fan 1 lies on the rotational axis 7. Instead of placing the motor 6 remote from the fan 1, it is also possible to place the motor 6 directly in the centre 4 of the fan 1.

Preferably, the fan 1 consists of several blades 2. These blades may have different shapes not limited to the shape shown in the figures. The fan may consist of two or more blades not limited to the number of four blades as shown in the figures.

Attached to at least one blade 2 is a weight 3. This weight 3 is held to the centre 4 of the fan 1 by the force of a spring 5. Hereby, one or more weights 3 may be attached to one or more blades 2, but at least to one blade 2 no weight 3 is attached.

Figure 2:
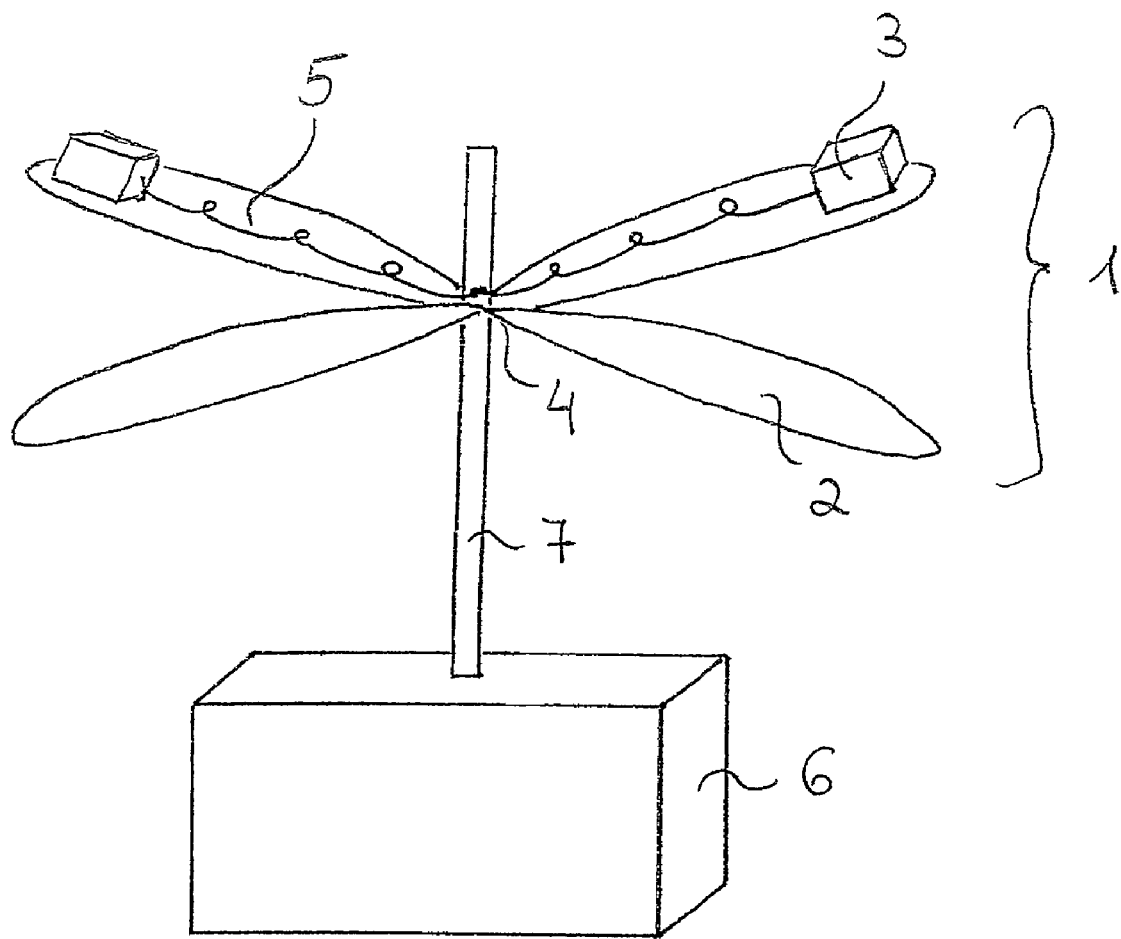
FIG. 2 shows the first embodiment of the present invention during a second operating status.

The weights 3 are movable along the blades 2 away from the centre 4 by centrifugal force as shown in FIG. 2. Hereby, at a low rotational speed of the fan 1 the weights 3 are prevented from moving away from the centre 4 of the fan 1 by the force of the spring 5. As soon as the fan 1 exceeds a certain rotational speed, then the spring 5 will not be able to hold the weight 3 against the centrifugal force to the centre 4 of the fan and the weight 3 will move towards the end of the blade 2 away from the centre 4.

The level of rotational speed when the weights move away from the centre 4 of the fan depends on the type of spring 5 and the heaviness of the weights 3. If e.g. the spring is very strong, then the weights 3 will start to move at a higher rotational speed, or if e.g. the weights 3 are heavier then they will start to move at a lower rotational speed.

In order to achieve cooling and vibration by this mechanism, the fan 1 either constantly or at predefined time intervals rotates at a low rotational speed in order to force the air to circulate through the mobile terminal and to cool it. During this operational state as shown in FIG. 1 the weights 3 are held to the centre 4 by the spring 5, so that the fan 1 has no unbalance and produces minimal noise.

When an event happens that requires vibration of the mobile terminal, e.g. the incoming of a call, a message or another kind of alert, then the rotational speed will be increased by the motor 6 until it exceeds the predefined level, so that the weights 3 start to move outwards away from the centre 4 of the fan 1 as shown in FIG. 2. As to at least one blade 2 no weight 3 is attached, the outwardly moving weights will cause an unbalance of the fan 1 and thereby cause vibration of the rotating fan 1.

In order to stop the vibration, the rotational speed is decreased again so that the weights 3 are forced back to the centre position by the spring 5 and the unbalance of the fan is removed, so that a constant rotation for cooling is possible.

In order to prevent the weights 3 from moving uncontrolled and to force them to move along the blades 2, a mechanism has to be provided to give the weight 3 the possibility to move along the blade 2 but at the same time to hold it on a predefined direction of movement. FIGS. 3a to 3d show several possibilities how to achieve a controlled movement of the weight 3 by showing a cross-section of a blade 2 with an attached weight 3.

Figure 3A:
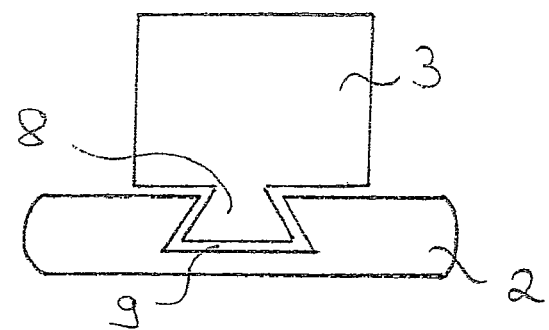
FIG. 3*a* to 3*d* shows a cross-section of a detail of the first embodiment of the present invention.
Figure 3B:
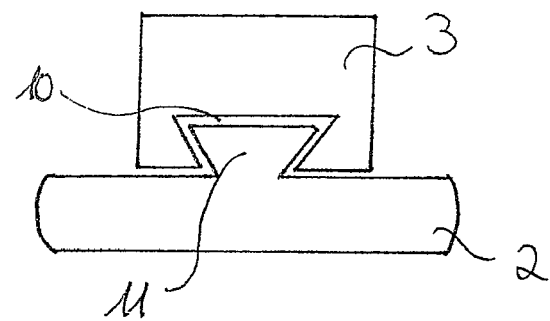

FIGS. 3a and 3b show a bar that extends from the centre of the fan 1 along the blade 2 till the end of the blade 2. In FIG. 3a the weight 3 has a protrusion 8 that mashes with a recess 9 in the blade 2. FIG. 3b shows also the system of a bar whereby the blade 2 has a protrusion 11 that mashes with a recess 10 of the weight 3. This way they weight 3 can move along the blade 2 but at the same time remains fixed to it.

Figure 3C:
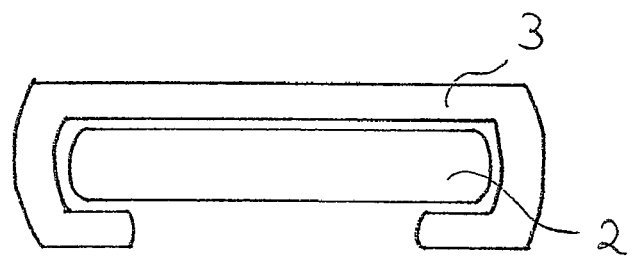

FIG. 3c shows the possibility that the weight 3 encompasses the blade 2 partially.

Figure 3D:
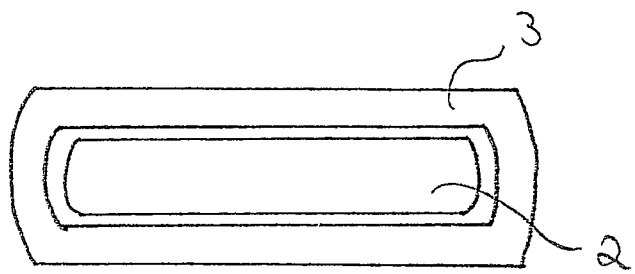

FIG. 3d shows the weight 3 encompassing the blade 2 totally.

It is to be noted that the invention is not limited to the types and forms of blades, weights and bars as shown in the figure but may comprise also every other form or type.

FIG. 4 shows a second embodiment of the present invention.

Hereby, the fan 1 is mounted to the first part of a rotational axis 7b which in turn is connected to the motor 6. On the second part of the rotational axis 7a an unbalanced weight 13 is provided. The weight 13 has a shape that causes unbalance during rotation. Therefore, the weight may either have an asymmetrical shape or the weight 13 may be attached only to one side of the rotational axis 7.

The first and second part of the rotational axes 7b, 7a are connected through a clutch. By this clutch 12 the second part of the rotational axis 7a can be coupled to the first part of the rotational axis 7b. The clutch 12 hereby connects the weight 13 to the first part of the rotational axis 7b in case the rotational speed caused by the motor 6 exceeds a certain level. Such a clutch 12 may be for example a centrifugal clutch.

This way the motor 6 causes the first part of the rotational axis 7b and thereby the fan 1 to constantly rotate in order to cool the mobile terminal. If an event happens, that requires an vibration alert of the mobile terminal, then the motor 6 will increase the rotational speed until exceeding the predefined rotational speed and thereby the second part of the rotational axis 7a and the weight will be coupled to the first part of the rotational axis 7b and start to rotate. As the weight 13 is unbalanced, this rotation of the weight will cause a vibration.

In order to stop the vibration the rotational speed by the motor 6 is decreased again so that the second rotational axis 7a and the weight 13 is decoupled and stops to rotate.

The invention claimed is:

1. A cooling system for a mobile terminal for wireless communication, comprising:
    a rotating fan comprising blades adapted to reduce the heat generated by the mobile terminal, and
    a vibration generation mechanism comprising at least one weight attached to at least one blade and moveable along said blade so that, when said weight is activated by a centrifugal force when the rotational speed of the fan exceeds a predefined level, said weight moves outwardly along said blade, increasing an unbalance of the fan and therefore a vibration of the fan.

2. A system according claim 1, wherein the fan consists of four blades.

3. A system according to claim 2, wherein each weight is attached to one blade.

4. A system according to claim 1, wherein at least one blade has no attached weight.

5. A system according to claim 1, wherein the weight is held to the centre of the fan by a spring.

6. A system according to claim 1, wherein the weight is guided along the blade by a bar.

7. A system according to claim 6, wherein the weight encompasses the blade.

8. A system according to claim 1, wherein the weight is coupled to the fan by a clutch.

9. A system according to claim 8, wherein the weights and the fan have a common rotational axis.

10. A system according to claim 9, wherein the clutch is a centrifugal clutch.

11. A mobile terminal for wireless communication having a cooling system according to claim 1.

* * * * *

UNITED STATES PATENT AND TRADEMARK OFFICE
CERTIFICATE OF CORRECTION

PATENT NO. : 7,880,586 B2  
APPLICATION NO. : 10/599787  
DATED : February 1, 2011  
INVENTOR(S) : Gustav Fagrenius et al.

Page 1 of 1

It is certified that error appears in the above-identified patent and that said Letters Patent is hereby corrected as shown below:

Title page, Section (60), Related U.S. Application Data should be added:
-- Related U.S. Application Data
(60) Provisional Application No. 60/565,650, filed on April 27, 2004. --

Col. 1 line 4
Specification, CROSS REFERENCE TO RELATED APPLICATION should be added immediately after the title:
-- CROSS REFERENCE TO RELATED APPLICATION
This application is a §371 of International Application No. PCT/EP2005/003621 filed on April 6, 2005, which claims benefit to U.S. Provisional Application No. 60/565,650 filed on April 27, 2004, and also claims priority to European Application No. 04009543.2 filed on April 22, 2004. --

Signed and Sealed this
Fifteenth Day of November, 2011

David J. Kappos
*Director of the United States Patent and Trademark Office*